United States Patent

Chen et al.

Patent Number: 5,718,133
Date of Patent: *Feb. 17, 1998

[54] AUTO STEERING WHEEL LOCK

[75] Inventors: Shih-Yu Chen, Tainan Hsien; Shu-Hwa Lin, Taichung Hsein, both of Taiwan

[73] Assignee: All Ship Enterprise Co., LTD., Tainan Hsien, Taiwan

[*] Notice: The term of this patent shall not extend beyond the expiration date of Pat. No. 5,440,908.

[21] Appl. No.: 568,681

[22] Filed: Dec. 7, 1995

[51] Int. Cl.⁶ .................................................. B60R 25/02
[52] U.S. Cl. .................. 70/209; 70/211; 70/226; 70/237
[58] Field of Search .............................. 70/209, 211, 212, 70/225, 226, 237, 238, 461, 18, 19; 292/DIG. 60, DIG. 73, DIG. 56

[56] References Cited

U.S. PATENT DOCUMENTS

| | | | |
|---|---|---|---|
| 1,156,739 | 10/1915 | Backus | 70/19 |
| 1,429,334 | 9/1922 | Furber | 70/209 |
| 1,474,119 | 11/1923 | Robertson | 292/258 |
| 2,417,970 | 3/1947 | Comber | 292/DIG. 73 |
| 3,828,593 | 8/1974 | Bolton | 70/209 |
| 4,829,797 | 5/1989 | Wu | 70/209 |
| 5,025,646 | 6/1991 | Waguespack, Jr. | 70/209 |
| 5,055,823 | 10/1991 | Fuller | 340/426 |
| 5,097,685 | 3/1992 | Lien | 70/209 |
| 5,115,652 | 5/1992 | Starmer | 70/209 |
| 5,129,245 | 7/1992 | Chang | 70/209 |
| 5,157,951 | 10/1992 | Chen et al. | 70/209 |
| 5,168,732 | 12/1992 | Chen et al. | 70/209 |
| 5,299,438 | 4/1994 | Chen | 70/209 |
| 5,353,615 | 10/1994 | Chen | 70/209 |
| 5,359,869 | 11/1994 | Chen | 70/209 |
| 5,375,441 | 12/1994 | Liou | 70/209 |
| 5,440,908 | 8/1995 | Lin | 70/209 |
| 5,452,597 | 9/1995 | Chen | 70/209 |
| 5,454,242 | 10/1995 | Su | 70/209 |
| 5,457,972 | 10/1995 | Lo | 70/209 |

*Primary Examiner*—Steven N. Meyers
*Assistant Examiner*—Tuyet-Phuong Pham
*Attorney, Agent, or Firm*—Morton J. Rosenberg; David I. Klein; Jun Y. Lee

[57] ABSTRACT

An auto steering wheel lock is provided which has a locking set and which is connected with the steering wheel by means of a gripping trench and an auxiliary block, and is blocked with the outside of the instrument panel by means of a blocking rod. The position of the auxiliary block can be adapted for various steering wheels of different sizes by means of an elastic element. The locking set mainly includes a lock and a lock rod, which has a flat recess for engagement by a blocking pin when turning the lock and so obstruct the lock rod from withdrawing.

1 Claim, 4 Drawing Sheets

5,718,133

AUTO STEERING WHEEL LOCK

OBJECT OF THE INVENTION

The main object of the invention is to offer a kind of auto steering wheel lock which is connected with the steering wheel and blocked with the outside of the instrument panel.

SUMMARY OF THE INVENTION

An auto steering wheel lock of the present invention comprises a main body, an auxiliary block, a lock and a lock rod.

The main body includes a steering wheel gripper, which acts together with the auxiliary block to hold firmly the steering wheel, and a blocking rod, which is a thick hard metal rod and is positioned just on the outside of the instrument panel to be obstructed from moving.

The lock rod has a flat recess at one end for a blocking pin fitted inside the main body to be able to engage the flat recess when turning the lock connected with the lock rod and so obstruct the lock rod from withdrawing.

BRIEF DESCRIPTION OF THE DRAWINGS

The invention will be better understood by reference to the accompanying drawings, wherein.

DESCRIPTION OF THE PREFERRED EMBODIMENTS

Figure 1:
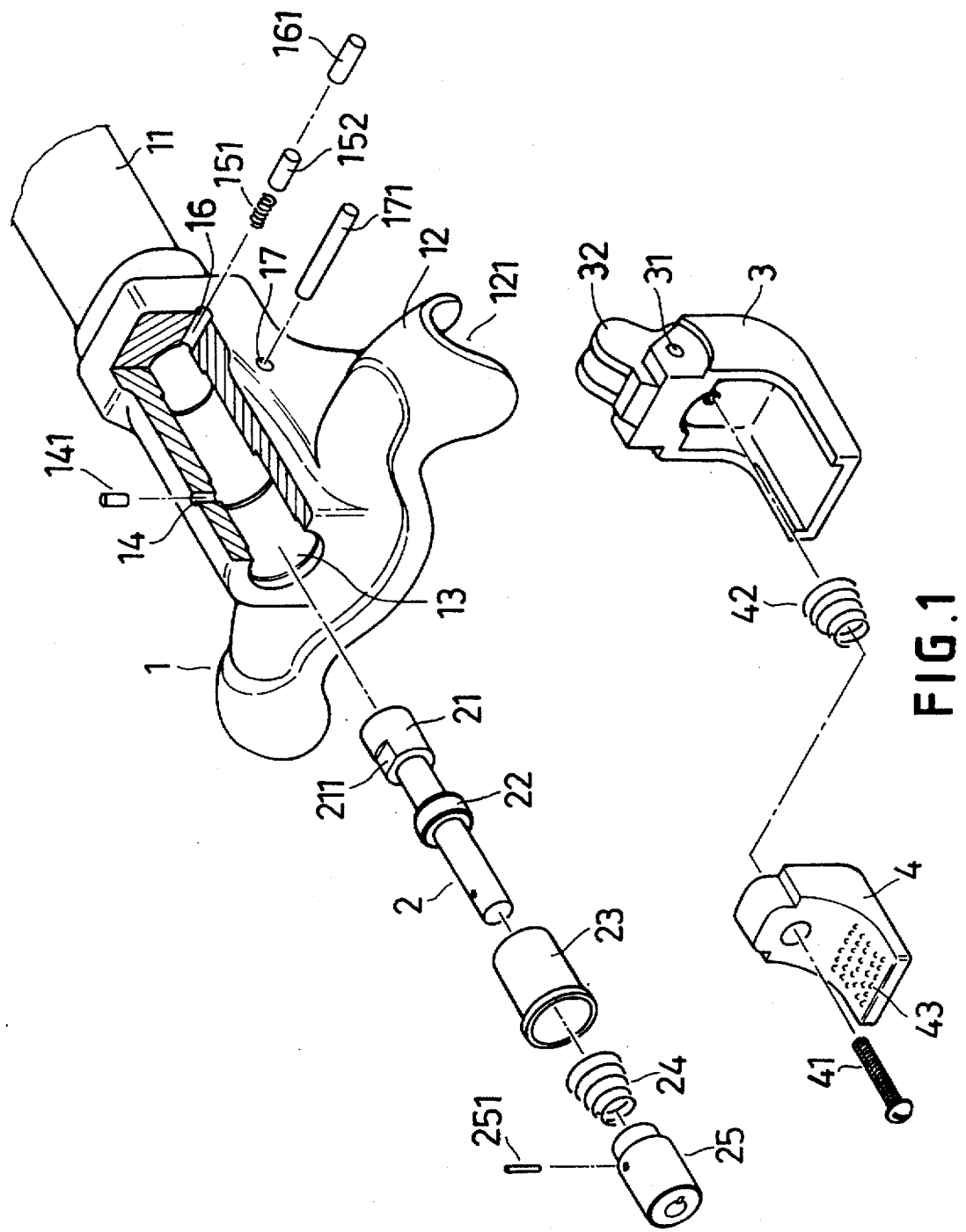
FIG. 1 is an exploded view of an auto steering wheel lock of the present invention.

An auto steering wheel lock, as shown in FIG. 1, comprises an auxiliary block 4, a clipping element 3, a lock 25, a lock rod 2 and a main body 1 as the main parts.

The clipping element 3 is shaped as a seat and includes a blocked end 32, a pivot hole 31 and a threaded hole (not numbered) into which an elastic element 42 and the auxiliary block 4 are screwed with a screw 41.

The lock rod 2 has at one end a locking end 21 provided with a flat recess 211, in the mediate portion a ringed convex 22 and at the other end a pin hole (not numbered) into which the lock 25 is screwed with a set pin 251. A socket 23 housing both an elastic element 24 and the lock 25 is inserted through with the lock rod 2 and blocked by the ringed convex 22.

Figure 5:
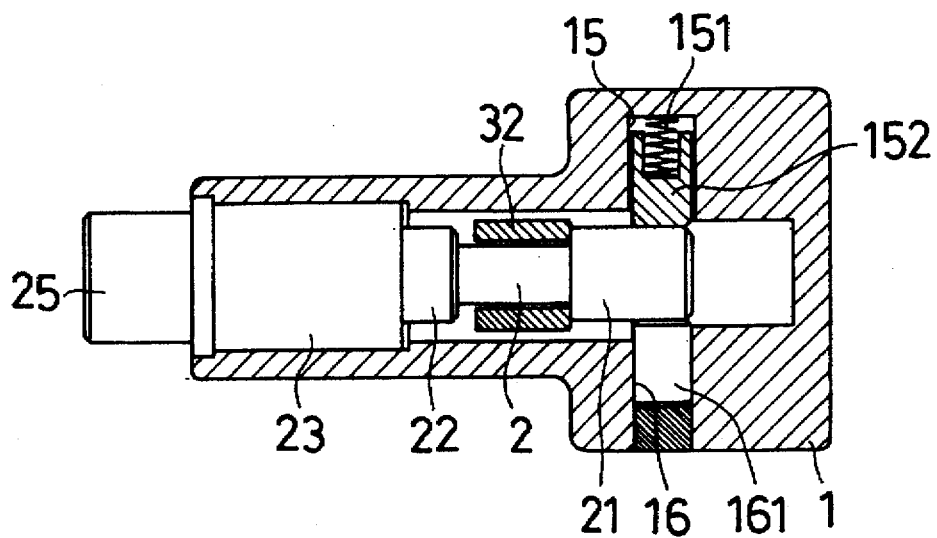
FIG. 5 is a view showing where the lock rod of the auto steering wheel lock of the present invention is positioned inside the main body.

The main body 1 has a housing channel 13 for housing the lock 25 and the lock rod 2 combined together, a blocking rod 11, through holes 16, 17, a cavity 15 (as shown in FIG. 5), pin holes 14, and a steering wheel gripper 12 provided on the bottom with a gripping trench 121 shaped as an arc of a circle for holding a steering wheel of a car.

In assembling the autos steering wheel lock, the lock rod 2, combined with the lock 25, the elastic element and the socket 23, is inserted into the housing channel 13 of the main body 1, a spring 151 together with a blocking pin 152 being positioned inside the cavity 15; a plug 161 being used to seal up the through hole 16; pins 141 being inserted into the pin holes 14 in order to fix the socket 23 by means of the outer circumference of the socket 23. The clipping element 3 is connected with the main body 1 by means of a pivot rod 171 inserted through the through hole 17 and the pivot hole 31; thus, the clipping element 3 can move, using the pivot rod 171 acting as a pivot.

Figure 2:
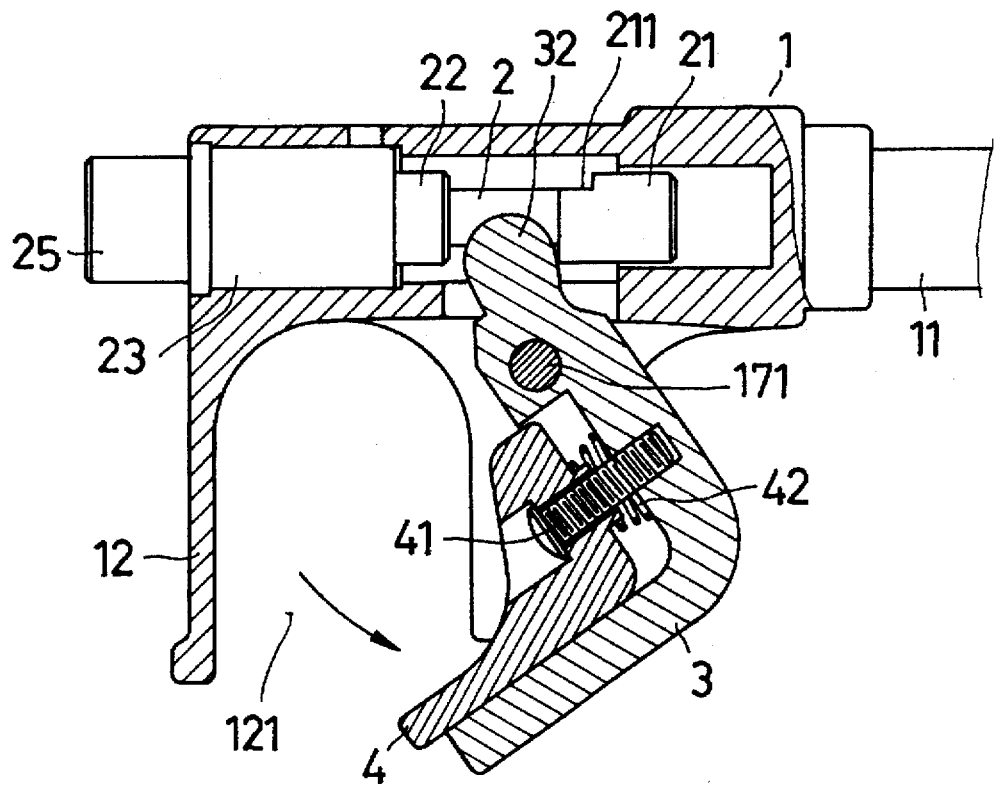
FIG. 2 is a view showing the action of positioning the gripping trench of the main body onto the auto steering wheel.
Figure 3:
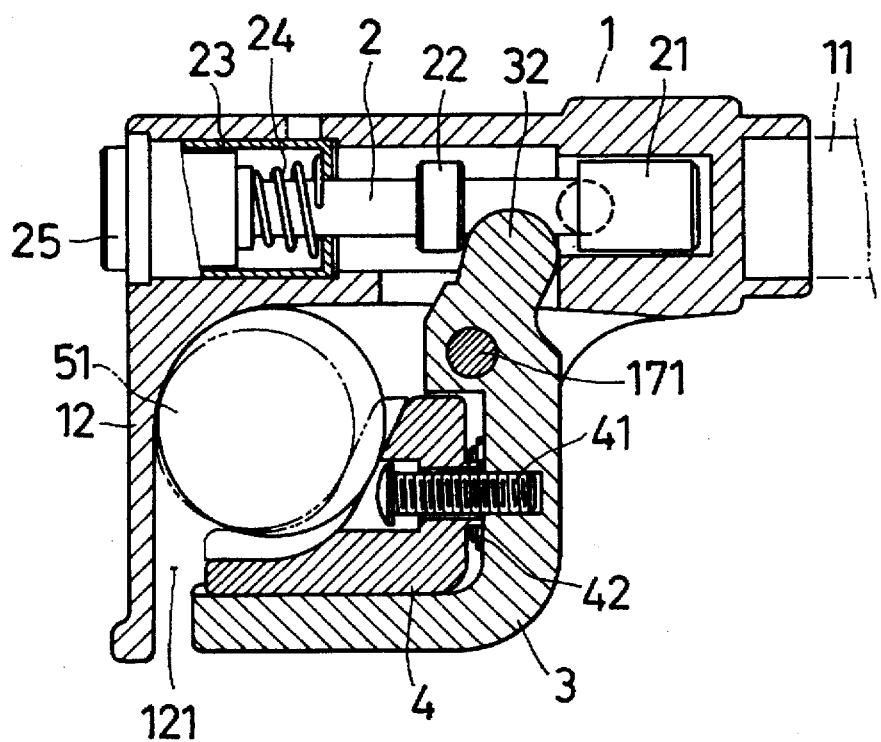
FIG. 3 is a view showing the autos steering wheel lock with the gripping trench of the main body having been positioned onto the auto steering wheel.
Figure 4:
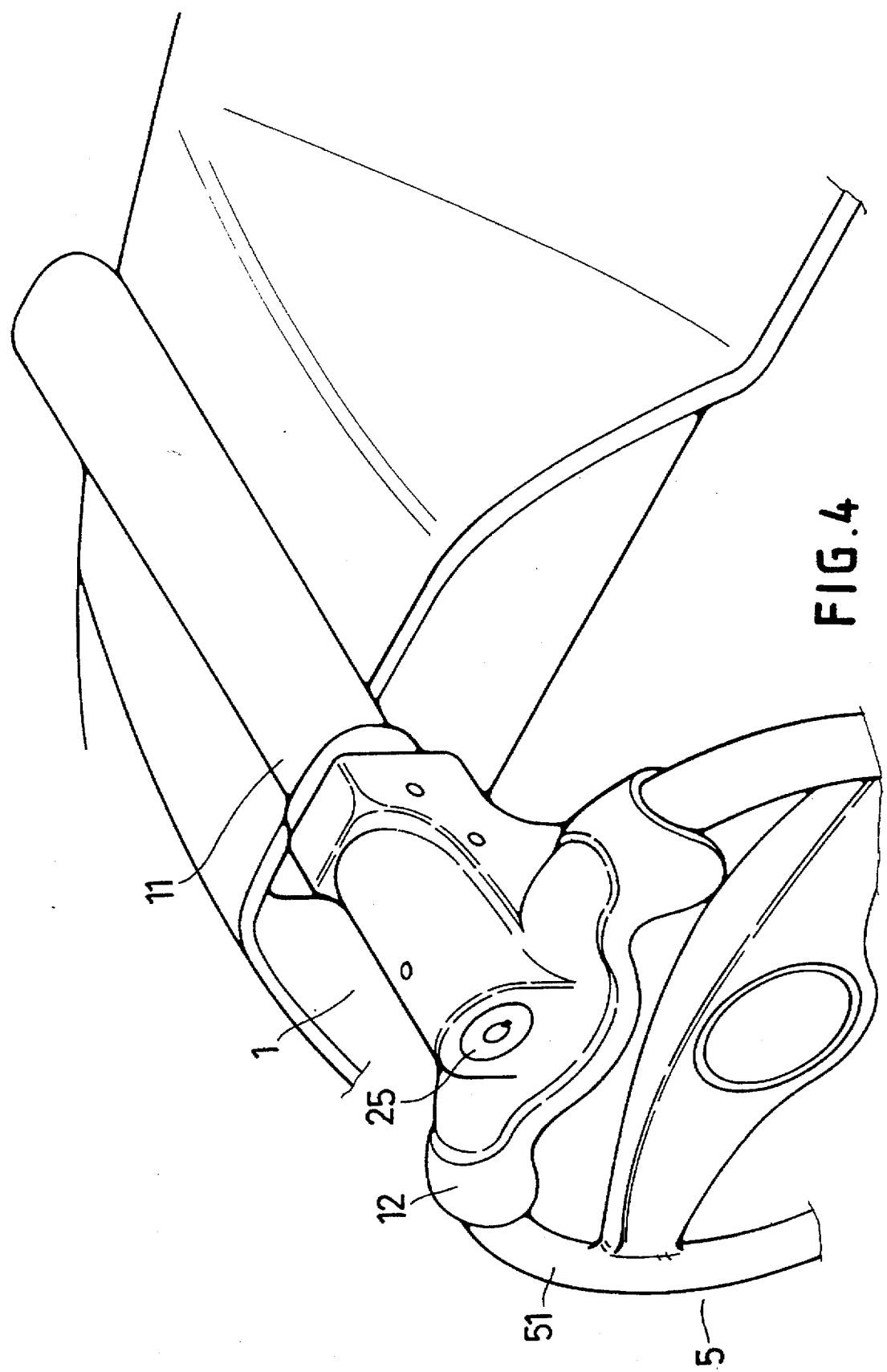
FIG. 4 is a view showing the appearance of the auto steering wheel of the present invention.
Figure 6:
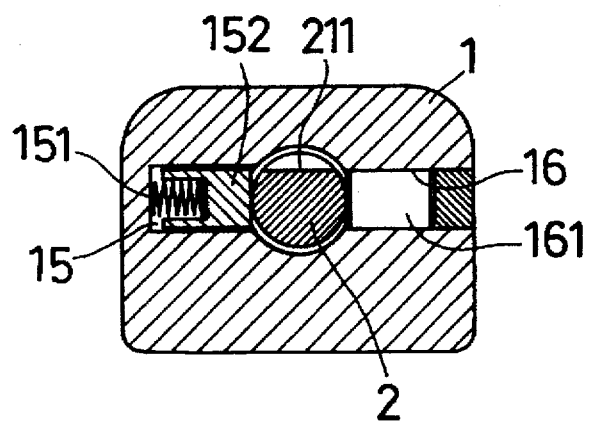
FIG. 6 is a cross sectional view of the lock rod, the spring and the blocking pin in an unlocked position; and, FIG. 7 is a cross sectional view of the lock rod, the spring and the blocking pin in a locked positon.
Figure 7:
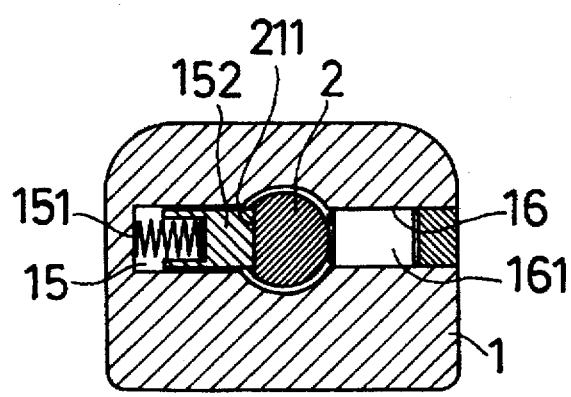

In using the autos steering wheel lock, referring to FIGS. 2–4, first the steering wheel gripper 12 is positioned on the top of the autos steering wheel and then the auxiliary block 4 combined with the clipping element 3 is moved to touch the steering wheel so that the steering wheel is held firmly between the gripping trench 121 and the auxiliary block 4. Then the lock 25 is turned and pushed inward to make the flat recess 211 of the lock rod 2 move to a desired position so that (referring to FIGS. 5–7) the blocking pin 152 connected with the spring 151 can snap onto the flat recess 211 and block the blocking end 21 of the lock rod 2 and (referring to FIG. 2, 3) the blocked end 32 of the clipping element 3 can be blocked and retained in position by means of the ringed convex 22 of the lock rod 2.

Furthermore, the auxiliary block 4 is provided with protruding grinds 43 which make the auxiliary block 4 grip the steering wheel more firmly by means of the frictional force; and, the elastic element 42 make the position of the auxiliary block 4 be able to be adapted for steering wheels of different sizes.

While the preferred embodiments of the invention have been described above, it will be recognized and understood that various modifications may be made therein and the appended claims are intended to cover all such modifications which may fall within the spirit and scope of the invention.

What is claimed is:

1. A steering wheel lock comprising:

a main body including a gripper portion having an arcuate recess for engagement with a portion of a steering wheel and a longitudinally extended blocking rod extending transversely from said gripper portion, said blocking rod having a longitudinally directed bore formed therein and open on an end of said blocking rod adjacent said gripper portion;

a lock rod coupled to a lock and disposed in said bore for longitudinal displacement therein;

an L-shaped clipping element pivotally coupled to said blocking rod and having a blocked end disposed within said bore for displacing an opposing end thereof into proximity of the portion of the steering wheel engaged by said gripper portion arcuate recess responsive to said longitudinal displacement of said lock rod;

an auxiliary block slidingly coupled to said clipping element for clampingly engaging the steering wheel, said auxiliary block having a recessed opening formed therein for slidingly receiving a screw therethrough, said screw being threadedly engaged to said clipping element; and, an elastic element concentrically disposed around said screw between said auxiliary block and said clipping element for displacing said auxiliary block with respect to said clipping element to automatically adjust said clamping engagement of said auxiliary block for steering wheels of different sizes.

* * * * *